United States Patent [19]

Saitoh et al.

[11] Patent Number: 4,876,134
[45] Date of Patent: Oct. 24, 1989

[54] LAMINATED PANEL HAVING A STAINLESS STEEL FOIL CORE AND A PROCESS FOR PRODUCING THE PANEL

[75] Inventors: Yoshiro Saitoh, Nishinomiya; Takashi Tatsumi, Moriyama, both of Japan

[73] Assignee: Ciba-Geigy Corporation, Ardsley, N.Y.

[21] Appl. No.: 105,071

[22] Filed: Oct. 5, 1987

[30] Foreign Application Priority Data

Oct. 6, 1986 [JP] Japan .................................. 61-237738
Oct. 6, 1986 [JP] Japan .................................. 61-237739
Oct. 13, 1986 [JP] Japan .................................. 61-242336
Oct. 30, 1986 [JP] Japan .................................. 61-259592
Nov. 8, 1986 [JP] Japan .................................. 61-265835

[51] Int. Cl.$^4$ ................................................ B32B 3/00
[52] U.S. Cl. ................................. 428/73; 428/116; 428/118; 428/182; 428/593; 428/604; 156/197; 156/227; 156/270
[58] Field of Search .................. 428/73, 116, 118, 182, 428/593, 604; 156/197, 227, 270

[56] References Cited

U.S. PATENT DOCUMENTS

| | | |
|---|---|---|
| 2,674,295 | 4/1954 | Steele . |
| 2,983,640 | 5/1961 | Knoll et al. ........................... 428/116 |
| 2,999,306 | 9/1961 | Baxter .................................. 428/116 |
| 3,200,489 | 8/1965 | Keeleric . |
| 3,483,070 | 12/1969 | Kennedy et al. . |
| 3,556,917 | 1/1971 | Eakin et al. ........................... 428/73 |
| 3,616,141 | 10/1971 | Anderson . |
| 4,522,859 | 6/1985 | Blair .................................... 428/116 |

FOREIGN PATENT DOCUMENTS

| | | | |
|---|---|---|---|
| 992280 | 7/1976 | Canada ................................. 428/73 |
| 2234704 | 2/1973 | Fed. Rep. of Germany ........ 428/73 |
| 850197 | 10/1960 | United Kingdom . |
| 1151097 | 5/1969 | United Kingdom . |
| 1214291 | 12/1970 | United Kingdom . |

*Primary Examiner*—Ellis P. Robinson
*Assistant Examiner*—P. J. Ryan
*Attorney, Agent, or Firm*—Harry Falber

[57] ABSTRACT

A process for producing a laminated panel core made of stainless steel includes the step of preparing a core of the laminated panel by subjecting stainless steel foils to repeated outward and inward foldings in a constant mode in one direction to make a plurality of multi-layered folded sheets of stainless steel. An adhesive is applied to a portion of the surfaces of the folded sheets and a desired number of the multi-layered sheets are laminated. The adhesive causes the sheets to adhere to one another in the areas of application of the adhesive. The laminate is sliced in a plane perpendicular to the plane generally defined by each of the multi-layered sheets into an appropriate small thickness and is extended and deformed in a plane parallel to the plane in which the laminate is sliced and in the direction of lamination of the sheets. A multi-layered sheet for use in a process for forming laminated panels and a stainless steel foil core for use in a laminated panel are also disclosed.

12 Claims, 9 Drawing Sheets

LAMINATED PANEL HAVING A STAINLESS STEEL FOIL CORE AND A PROCESS FOR PRODUCING THE PANEL

BACKGROUND OF THE INVENTION

1. Field of the Invention

The present invention relates generally to laminated panels and, more particularly, to a laminated panel having a stainless steel foil core, wherein the core of the panel is a perforated core prepared by laminating and bonding together plural multi-layered sheets of stainless steel. The invention also relates to a process for producing the laminated panels.

2. Description of the Prior Art

Laminated panels such as honeycomb panels and the like have conventionally been used as structural materials in ceiling, wall and floor constructions as well as in ships and aircraft.

Known honeycomb panels have commonly been prepared by using an aluminum foil, a resin-impregnated paper, a cellulose ester sheet or some other type of plastic sheet as the honeycomb core material. Aluminum honeycomb panels are largely in use because of their light weight and high productivity.

However, laminated panels using aluminum cores of certain grades are readily corroded when contacted with aqueous systems, particularly saline water. With progress of the corrosion, their strength is remarkably decreased.

In contrast, laminated panels using paper and plastics are very light in weight and are not typically subject to the same types of corrosion as are aluminum cores, but they have a fault that they are readily deformed by heat and some of them are combustible.

If both corrosion resistance and heat resistance are taken into account, stainless steel is considered the best core material Nevertheless, no laminated panel made from stainless steel core has yet been developed which can be produced in an economically reasonable manner to make the use of stainless steel in such structures feasible.

Therefore, it would be desirable to provide a process for producing, with a certainty, a laminated panel which has a stainless steel core and which is excellent in strength, light in weight, abrasion resistant and heat resistant.

An example of a known cellular structure and a method of making the structure is disclosed in United Kingdom Patent Specification No. 850,197, wherein a honeycomb structure is formed by expanding a plurality of bands which have been coupled together by a plurality of smaller elements between the bands. According to the disclosure of the U.K. No. 850,197 patent, any material such as cardboard, paper, metal or synthetic resin may be employed in the construction of the cellular structure of the patent. However, the patent further discloses that where metal is used as the material, it is necessary to make the joints between the layers of material by effecting a spot welding or brazing. Such processes increase the cost of producing the cellular material and complicate the method.

Other examples of similar methods of constructing cellular material from layered sheets of folded material are disclosed in U.K. Patent Specification No. 1,151,097 and U.K. Patent Specification No. 1,214,291. The structures and methods disclosed in these patents are typical of the structures discussed above which employ paper, plastic or metal materials to form the sheets from which the cellular structures are produced. The U.K. Patent No. 1,151,097 discloses the use of seam welding or soldering as possible means for bonding metallic surfaces of the honeycombs.

It is known that stainless steel foil cannot be shaped in a honeycomb structure in the same manner as paper or aluminum since paper and aluminum possess little rigidity and reversion power while being easily deformable, whereas metal is more rigid and tends to revert to its previous shape more than does aluminum or paper.

OBJECTS AND SUMMARY OF THE INVENTION

The present inventors have found that a conventional, simple and economic method can also be utilized with stainless steel foil, where the multi-layer fold structure has been formed previously and the structure is stretched and pressed by the disclosed method. By the disclosed method, the rigidity and reversion power of the stainless steel is well utilized. Therefore, it is possible, through the use of the present invention, to provide a honeycomb core having improved strength, lightness, and abrasion and heat resistance.

A multi-layered folded sheet for use in the inventive laminated panel core comprises a stainless steel foil sheet which is bent along a plurality of parallel lines in repeated bends so that creases are formed which are parallel to one another. In a preferred embodiment of the invention, the bends are either alternating inward, outward bends or alternating outward, inward, inward, outward bends.

As used in this application, the term "inward bending" refers to a mode of bending in which a stainless steel foil is bent upward at a crease line so that the upward bent part becomes superposed on the upper surface of the basal part of the foil. The term "outward bending" refers to a mode of bending in which a stainless steel foil is bent downward at a crease line so that the downward bent part becomes superposed on the lower surface of the basal part of the foil.

According to the present invention, a stainless steel foil core for use in a laminated panel includes a plurality of strips of stainless steel foil, each of which is bent along a plurality of lines extending in a direction perpendicular to the length of the strips. The plurality of lines are parallel to one another. Adhesive material is interposed between the strips at spaced intervals along the length of the strips so as to bond the plural strips together at the spaced intervals. The bonded strips define a plurality of cells each having an equal number of sides. For example, each of the cells may be rectangular, hexagonal or tetradecagonal. The manner in which the sheets are bent determines the shape of the cells which are formed in a laminate in the inventive process.

The inventive process by which a laminated panel is formed includes the initial step of preparing a core of the panel by subjecting stainless steel foils to repeated outward and inward foldings in a constant mode in one direction to make a plurality of multi-layered folded sheets of stainless steel. In a preferred construction the folded sheets have a size of about 2600 mm by 1300 mm. Thereafter, an adhesive is applied to a portion of the exposed surfaces of the folded sheets and a desired number of the multi-layered sheets are laminated. The adhesive causes the sheets to adhere to one another in the areas of application of the adhesive.

The laminate is thereafter sliced in a plane perpendicular to the plane generally defined by each of the the multi-layered sheets into an appropriate small thickness and is extended and deformed in a plane parallel to the plane in which the laminate is sliced and in the direction of lamination or stacking of the sheets.

Preferably, according to the inventive process, the sliced laminate of the multi-layered folded sheet is extended and deformed two-dimensionally in the direction of lamination on the one hand and in the direction perpendicular to the direction of lamination on the other hand, either simultaneously or successively. According to a most preferable embodiment, the sliced laminate is first extended in the direction of lamination to a certain extent and subsequently in the direction perpendicular to the direction of lamination to a greater extent.

According to another preferable embodiment of the invention, a sliced laminate of three-layered folded sheet is extended in the direction perpendicular to the direction of lamination until the three-layered folded sheet becomes nearly planar and thereafter the laminate is released from the tensile force, by which a honeycomb-like perforated core is formed owing to the restoring force.

According to yet another preferable embodiment of the invention, a sliced laminate is extended until the three-layered folded sheet has become nearly planar and, at this moment, an appropriate surface pressure is applied to the sliced laminate in the direction of lamination to control the magnitude of the restoring force.

According to a still further preferable embodiment of the invention, a sliced laminate of three-layered folded sheet is extended and deformed in the direction perpendicular to the direction of lamination until the three-layered folded sheet becomes nearly planar and subsequently a pressure is applied thereto in the direction reverse to the direction of extension and therby the sliced laminate is forcibly return-deformed so that the three-layered folded sheet is again folded and produces a new crease at the border-line position between the area coated with adhesive and the area not coated with adhesive.

By this process it is possible to produce a stainless steel laminated panel core in a simple and inexpensive fashion which is not previously known.

BRIEF DESCRIPTION OF THE DRAWING

The preferred embodiment of the invention is discussed in the following detailed description which should be considered in connection with the figures in the accompanying drawing, in which.

DETAILED DESCRIPTION OF A PREFERRED EMBODIMENT

Five different embodiments of preferred laminated panel core structures are illustrated in FIGS. 1–5. These embodiments are exemplary of the types of honeycomb-like structures which can be produced from the process disclosed in the following disclosure but are not intended to limit the types of structures which can be produced by the process in any way.

Figure 1:
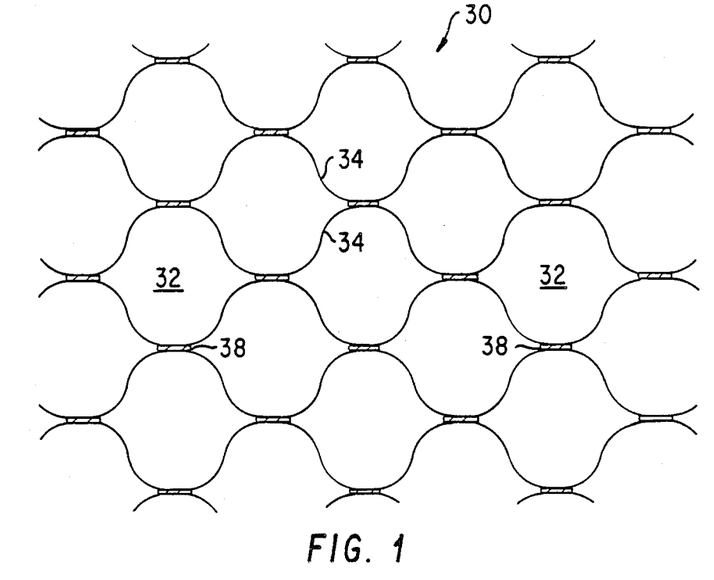
FIG. 1 is a front view of a panel core having a plurality of cells of tetradecagonal shape.

As can be seen in FIG. 1, a first type of cellular or honeycomb core structure 30 comprises a number of cells 32 of tetradecagonal shape, or rather of a shape having fourteen corners. Each cell of the core is formed between two sheets of stainless steel 34 or 36, shown separately in FIGS. 6 and 8, which have been folded, extended and deformed and which are bonded to each other by an adhesive material 38 applied between the sheets 34 or 36 at opposite ends of each cell 32. In the laminated panel of FIG. 1, each cell 32 of the core 30 is closer to being circular than prior known hexagonal or rectangular cells, so that the area occupied by one cell is much greater in the inventive core of FIG. 1 than in the prior art or in the embodiments of the invention illustrated in FIGS. 2-5. Accordingly, the laminated panel formed from a core of the type shown in FIG. 1 is lighter in weight than prior honeycomb panel products.

Since each core cell 32 of the laminated panel of FIG. 1 has a shape close to a circle, the core structure 30 is quite solid. Further, the laminated panel of FIG. 1, as well as the panels of FIGS. 2-5, is constructed from stainless steel foil which is much higher in strength and stiffness than aluminum foil. Accordingly, the laminated panel of the invention has a very high core strength, particularly compression strength.

Further, since the core of the laminated panel of the invention is made of stainless steel which is a non-corrosive metal, it is entirely free from corrosion when contacted with water and salt. In addition, it is non-combustible.

The method of producing the sheets which are employed in making the panel core 30 of FIG. 1, as well as the process for making the panel core itself will be discussed further below with reference to FIGS. 6-9, 15, 19, 21, 24 and 26.

Figure 2:
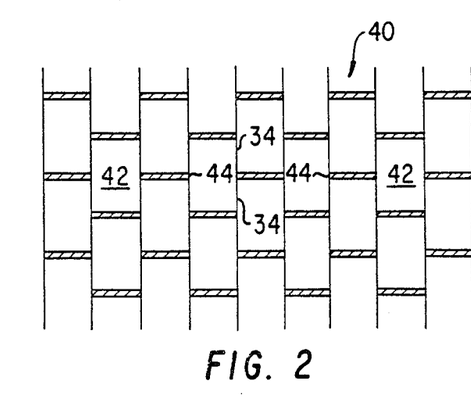
FIG. 2 is a front view of a panel core having a plurality of cells of rectangular shape.

A second panel core structure which can be constructed according to the inventive process is shown in FIG. 2 and includes a cellular or honeycomb structure 40 in which each of the cells 42 is of rectangular shape. This rectangular honeycomb structure is produced from a plurality of sheets 34 or 36 of the type used to make the embodiment of FIG. 1. However, the adhesive 44 which is applied between the sheets during the lamination of the sheets is applied differently than in the embodiment of FIG. 1 and the process for producing the panel core 40 may be varied so that the extension and deformation of the laminate is different from that of the first embodiment.

Figure 3:
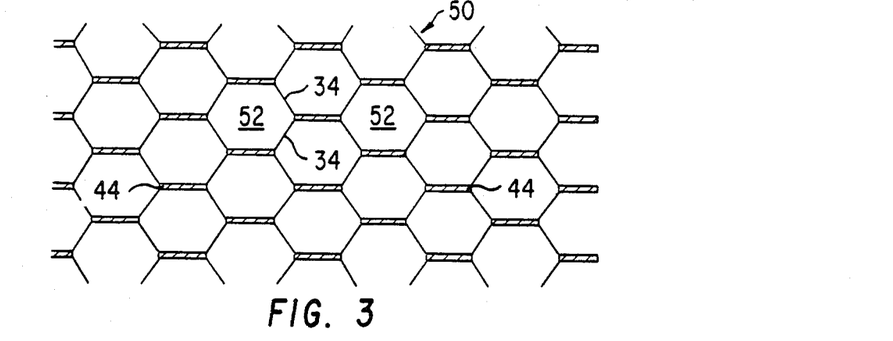
FIG. 3 is a front view of a panel core having a plurality of cells of hexagonal shape.

A third embodiment of a core structure 50 made in accordance with the present invention is shown in FIG. 3 and is very similar to the core 40 shown in FIG. 2 in that the method of making the sheets 34 or 36 of the laminate, as well as the laminate itself, is identical in both types of honeycomb cores 40 and 50. The only difference between the two types of cores is that the extension and deformation of the laminate is varied in the third embodiment to achieve an hexagonal shape of the cells 52 rather than a rectangular shape as in the second embodiment.

As can be seen, in using the three-layered folded sheet of the preferred embodiment of the invention in the inventive process, the conditions for the extension and deformation of the sliced laminate and the mode for coating the adhesive may be varied in various manners, whereby various honeycomb-like perforated cores having various cell shapes, such as rectangles, hexagons, tetradecagons, their analogous shapes and the like, can be obtained. The dimensions of the core cells are dependent on the distance between one bent site and the adjacent bent site (crease-crease distance in the three-layered folded sheet. By varying the design of this distance, various cores of which core diameter ranges from 2 mm-30 mm, can be produced.

Figure 4:
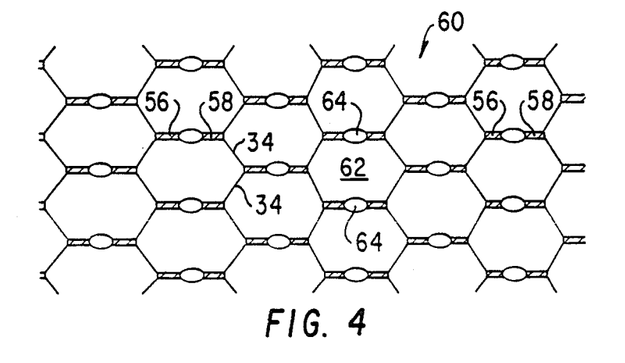
FIG. 4 is a front view of a panel core having a plurality of cells of a modified hexagonal shape.
Figure 14:
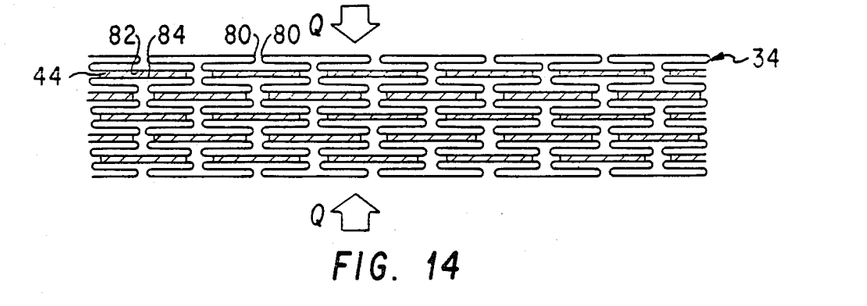
FIG. 14 is a side view of a first laminate formed from sheets of the type shown in FIG. 6.
Figure 16:
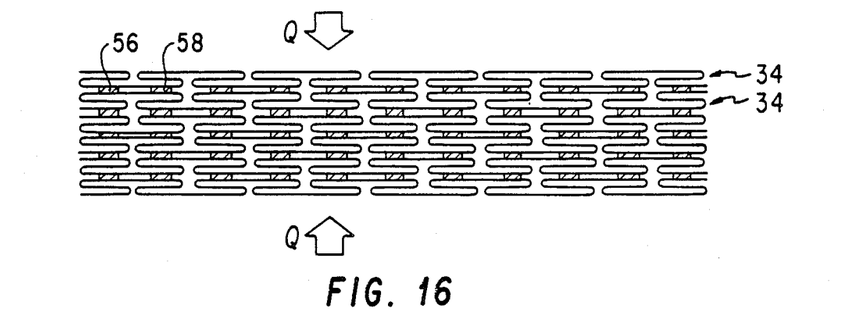
FIG. 16 is a side view of a third laminate formed from sheets of the type shown in FIG. 6.

If the adhesive layer is varied from that shown in FIG. 3, so that two separate but thinner lines 56, 58 of adhesive are applied between the sheets 34 or 36, see FIG. 16, instead of the single line 54 employed in the embodiment of FIG. 3, see FIG. 14, then a modified hexagonal honeycomb structure 60 may be produced as shown in FIG. 4. In this embodiment, each cell 62 of the honeycomb structure is bordered by two minute cells 64 of generally circular shape which are formed during the extension and deformation process discussed below through the application of a compressive force exerted on the laminate in a direction perpendicular to the direction of lamination.

Figure 5:
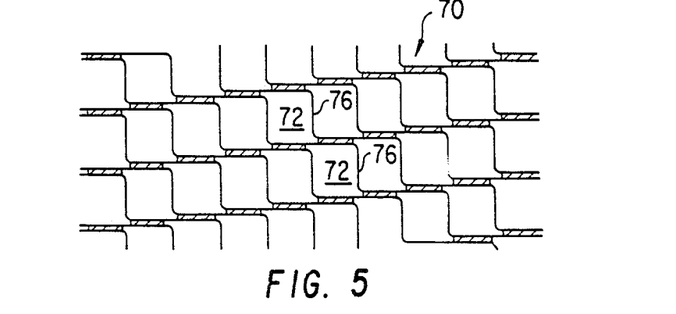
FIG. 5 is a front view of a panel core having a plurality of cells of a modified rectangular shape.
Figure 10:
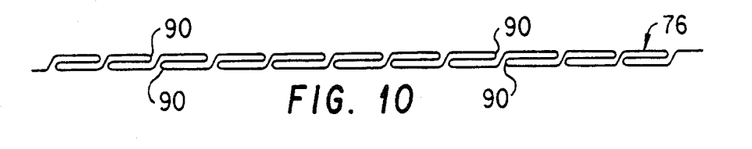
FIG. 10 is a side view of a sheet having a fold geometry useful in constructing a panel core of the type shown in FIG. 5.
Figure 12:
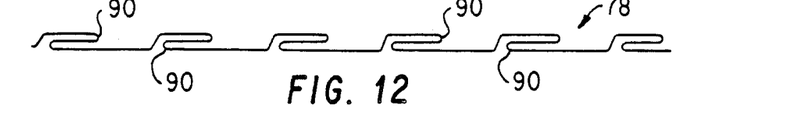
FIG. 12 is a side view of a sheet having a fold geometry similar to that shown in FIG. 10.

A fifth embodiment of a honeycomb panel core structure according to the present invention is illustrated in FIG. 5. The cells 72 of the core 70 in this embodiment are rectangular in shape but horizontally adjacent cells are offset from one another vertically so as not to be directly side by side. In order to produce a panel core having this type of cellular structure a plurality of folded multi-layered sheets 76 or 78 as shown in FIGS. 10 or 12 are laminated in a manner to be described below.

In all of the above-mentioned embodiments, the exact shape and size of the cells in the fabricated panel core structure are determined by the types of folded sheets used in the laminate, the placement of the adhesive between adjacent sheets of the laminate, and the direction and degree of extension and deformation that is carried out on the laminate during the formation process.

All five of the embodiments already discussed may be constructed from a laminate formed from two basic types of folded, multi-layered stainless steel sheets.

Figure 6:
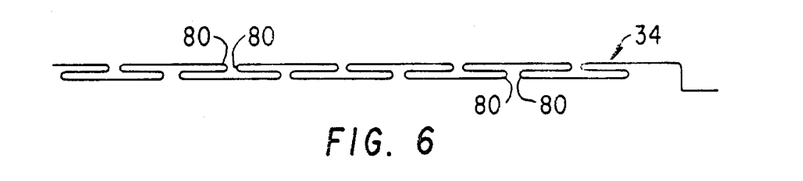
FIG. 6 is a side view of a sheet having a fold geometry useful in constructing a panel core of the type shown in FIGS. 1–4.
Figure 8:
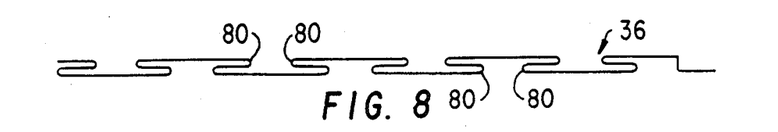
FIG. 8 is a side view of a sheet having a fold geometry similar to that shown in FIG. 6.

One of these sheet types is shown in FIGS. 6 and 8. The three layered folded sheet 34 shown in FIG. 6 is a sheet which has been produced by repeatedly folding a stainless steel foil in one direction in the order of an outward, inward, inward, and outward folding so that the resulting creases 80 become parallel to one another. As mentioned above, the term "inward folding" means a mode of folding which comprises bending a stainless steel foil upward at the crease and folding it so that its bent part becomes superposed on the upper surface of the basal part of the foil, and the term "outward folding" means a mode of folding which comprises bending a stainless steel foil downward at the crease and folding it so that the downward bent part becomes superposed on the bottom side of the basal foil.

The three-layered folded sheet of the invention is formed by making a number of parallel creases at a recurring interval of, for example, 1:2 or 1:3 and repeatedly bending the foil sheet at the positions of the creases in one direction in the above-mentioned order. A typical crease spacing might be, e.g. 5 mm:10 mm or 4 mm:12 mm. So-called box pleats are formed by the folding carried out in this manner. Preferably, the bending of stainless steel foil is carried out automatically by the use of an apparatus to which the mechanism of the automatic bending machine for paper, thin-gage metal, etc. is applied.

The three-layered folded sheet of the preferred embodiment of the invention is an entirely novel sheet structure made of stainless steel. In the present invention it is called FSP.

The stainless steel foil used in the preferred embodiment of the invention is an ultra-thin gage plate having a thickness of 50-150 microns, preferably 50-80 microns, of a stainless steel selected from the various stainless steels prescribed JIS, for example. Otherwise, a titanium (Ti) foil may also be used in place of the stainless steel foil.

Figure 7:
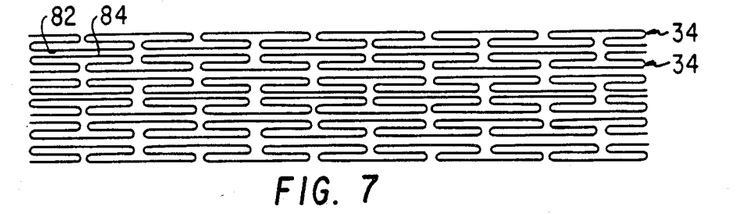
FIG. 7 is a side view of a plurality of sheets as shown in FIG. 6 illustrating the orientation of the sheets with respect to one another.

FIG. 7 shows the manner in which sheets of the type shown in FIG. 6 are arranged in a laminate. As can be seen from the figure, all of the exposed lower surfaces 82 of any given sheet are directly adjacent to the upper exposed surfaces 84 of the sheet directly beneath it so that the upper and lower surfaces of the sheets are directly adjacent to other exposed sheet surfaces.

Figure 9:
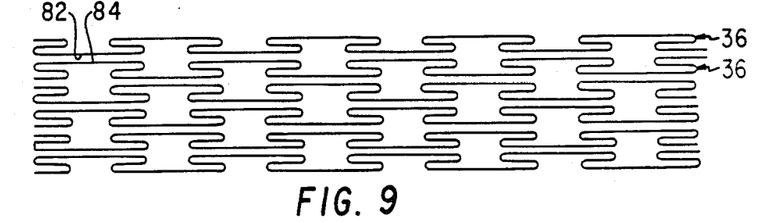
FIG. 9 is a side view of a plurality of sheets as shown in FIG. 8 illustrating the orientation of the sheets with respect to one another.

A modified box pleat sheet design is illustrated in FIG. 8. In this sheet design, the folding again occurs in a repeated outward, inward, inward, outward folding. However, in this sheet design, the distance between the creases 80 is modified so that the amount of sheet material which is included in the overlapped portion of the sheet 36 is reduced as compared with the folded sheet 34 of FIG. 6. The manner in which the folded sheets 36 of FIG. 8 are arranged in a laminate is shown in FIG. 9 and is similar to the arrangement of FIG. 7.

The second type of sheet design is illustrated in FIGS. 10-13. As shown in FIG. 10 the three-layered folded sheet 76 of the second design type is formed by repeatedly subjecting a stainless steel foil to inward bending and outward bending alternately in one direction so that the resulting creases 90 become parallel to one another. Pleats are formed by this type of folding pattern. The material used in the second design is identical to that discussed above with respect to the first design and can be formed by the same means.

Figure 11:
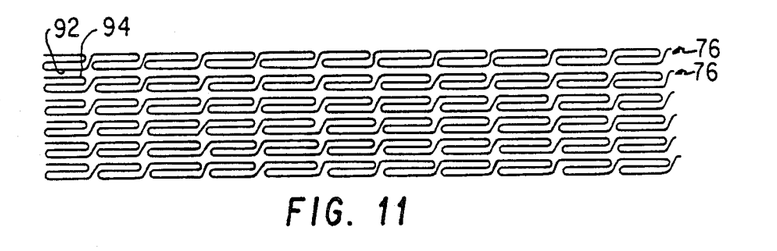
FIG. 11 is a side view of a plurality of sheets as shown in FIG. 10 illustrating the orientation of the sheets with respect to one another.
Figure 13:
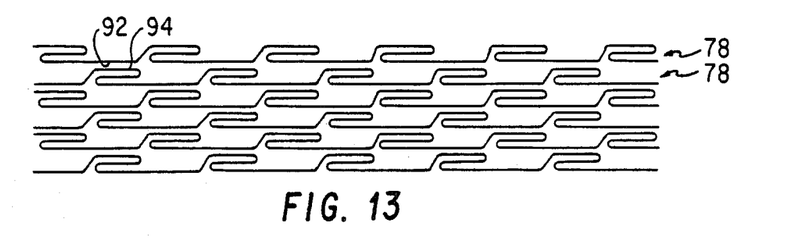
FIG. 13 is a side view of a plurality of sheets as shown in FIG. 12 illustrating the orientation of the sheets with respect to one another.

Again, as with the first folded sheet design, the spacing between the repeated folding pattern may be varied so as to permit the size and the shape of the cellular honeycomb structure to be changed. FIG. 12 illustrates one such spacing of the repeated folding pattern in which the repeated inward and outward folding of the sheet 78 occurs at spaced intervals. The manner in which these second types of folded, multi-layered sheets are arranged in a laminate is shown in FIGS. 11 and 13 respectively. As can be seen from either of the figures, the exposed upper and lower surfaces 92, 94 of the folded sheets 76 or 78 are arranged to be directly adjacent the exposed upper and lower surfaces 92, 94 of adjacent folded sheets 76 or 78. This permits adhesive applied between the sheets to bond the sheets together in a manner to be described below. As can be seen from FIG. 13, it is possible to stagger the sheets in the direction of lamination so that pleats in any given sheet are out of alignment with similar pleats in vertically adjacent sheets.

Having described the structure of the multi-layered folded sheets 34, 36, 76 or 78 used in the honeycomb panel core structures and the method of making the sheets, the manner in which the sheets are employed to make the honeycomb panel core structures will now be described with reference to FIGS. 14-26.

The first step in the inventive process involves preparing the upper and lower exposed surfaces of the multi-layered sheets to enhance the adhesive effect of the adhesive which is applied between the sheets in the laminate. A pretreatment such as mechanical abrasion, chemical treatment with an acid or an alkali or greasing treatment is preferred but it is understood that other known means exist for preparing a surface for use with an adhesive and the use of such means in the inventive process is recognized as falling within the scope of the invention.

Next, the adhesive is applied to the treated surfaces so that a laminate may be formed by stacking a plurality of the multi-layered sheets in a direction of lamination. The adhesive may be any adhesive, so long as it has a high enough adhesive force to allow no peel between the multi-layered folded sheets even when the laminate is extended and deformed. Examples of adhesives suitable for this purpose include epoxy adhesive, phenolic adhesive and any of several types of high temperature adhesives.

The adhesive may be coated on all or a part of the outer exposed surface of each pleat. If the adhesive is applied in one line only along the central part of the outer surface of a pleat, or in two lines along the edges of the exposed outer surfaces of the pleats, a stainless steel foil core having a complex cell form is obtained. Therefore, such modes of coating are preferred.

As can be understood, both the amount of adhesive applied between the folded sheets and the location of the adhesive have an affect on the shape and size of the cells of the honeycomb core.

The hexagonal and rectangular cellular structures of the invention shown in FIGS. 2 and 3 are best formed by applying the adhesive in a line parallel to the crease lines 80 and entirely covering the exposed upper and lower surfaces 84 and 82 of each pleat of the folded sheets 34 as is shown in FIG. 14. The adhesive is applied to the exposed outer surfaces of the pleats and the sheets are laminated so that the outer surfaces of the box pleats confront each other. In the preferred embodiment, a surface pressure of 4 kg/cm$^2$ is continuously applied to 520 three-layered folded sheets in the direction indicated by arrows Q for a period of 60-90 minutes at a temperature of, for example, 170 degrees Centagrade to cure the adhesive.

Figure 15:
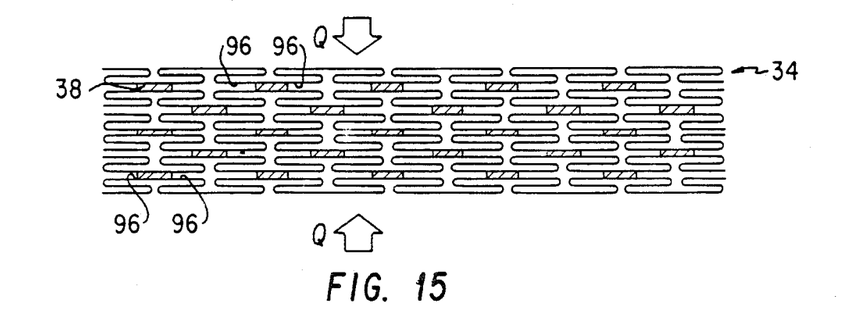
FIG. 15 is a side view of a second laminate formed from sheets of the type shown in FIG. 6.

FIG. 15 illustrates the preferred location of the adhesive material in a laminate for forming a core of the type shown in the embodiment of FIG. 1 wherein a tetradecagonal cell shape is to be formed. As can be seen from FIG. 15, the adhesive 38 is only placed in a line along a central portion of each exposed surface of the box pleats so that a nonbonded portion 96 of each exposed box pleat surface may be deformed during extension of the laminate in the panel core forming process. The manner in which the cell shape is created during the extension of the laminate will be discussed below.

A third adhesive arrangement is illustrated in FIG. 16 and includes placing two separate spaced lines 56, 58 of adhesive material along each exposed box pleat surface edge so that an unbonded gap exists between two adjacent exposed surfaces. By this arrangement it is possible, in a manner to be described, to construct a panel core 60 having a complex honeycomb-like structure of the type shown in FIG. 4.

Figure 17:
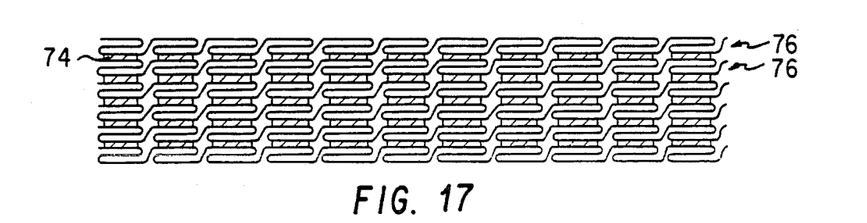
FIG. 17 is a side view of a laminate formed from sheets of the type shown in FIG. 10.
Figure 18:
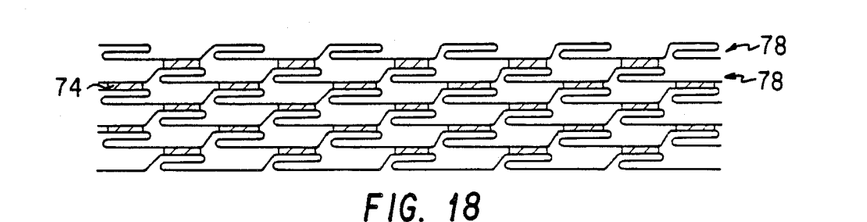
FIG. 18 is a side view of a laminate formed from sheets of the type shown in FIG. 12.

FIGS. 17 and 18 illustrate the manner in which folded sheets 76, 78 of the type shown in FIGS. 10 and 12 respectively are bonded together by adhesive 74. When this type of bonding arrangement is employed, a cellular structure 70 of the type shown in FIG. 5 will result from the panel core forming process described below.

Figure 19:
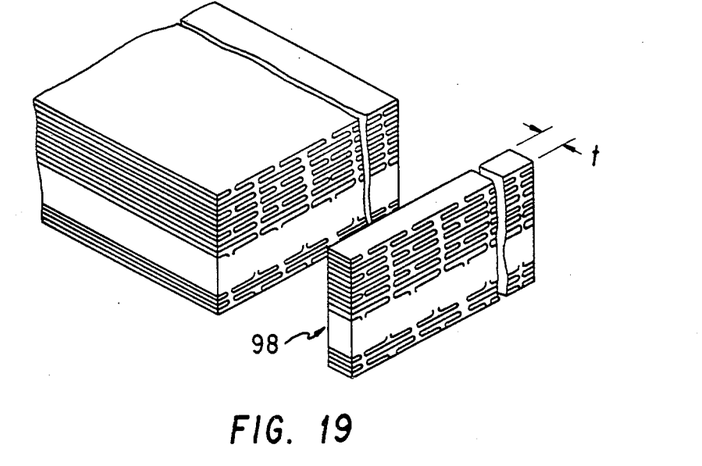
FIG. 19 is a perspective view of a laminate which has been sliced.

Once the folded multi-layered sheets have been combined into a laminate as described above and the adhesive has been cured, the laminate is sliced into a plurality of unextended panel cores 98 as shown in FIG. 19. Each sliced piece of the laminate has a thickness t corresponding to the intended width of the laminated panel core to be produced. An exemplary thickness of a preferred panel core is 5 mm to 70 mm.

Figure 20:
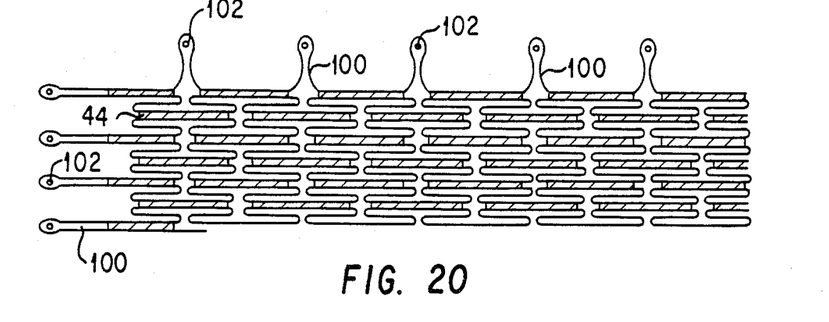
FIG. 20 is a side view of a laminate of the type shown in FIG. 14 attached to an extending means.
Figure 21:
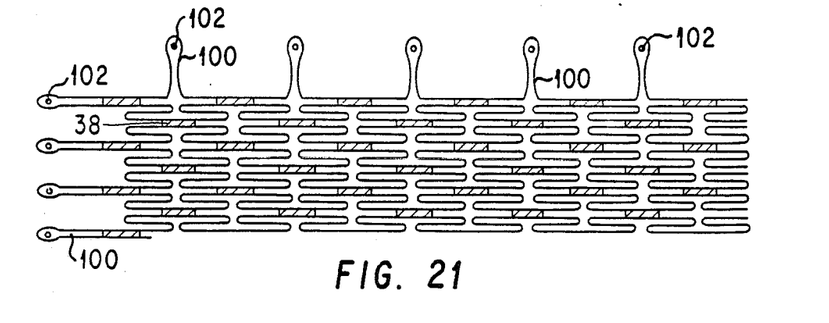
FIG. 21 is a side view of a laminate of the type shown in FIG. 15 attached to an extending means.
Figure 22:
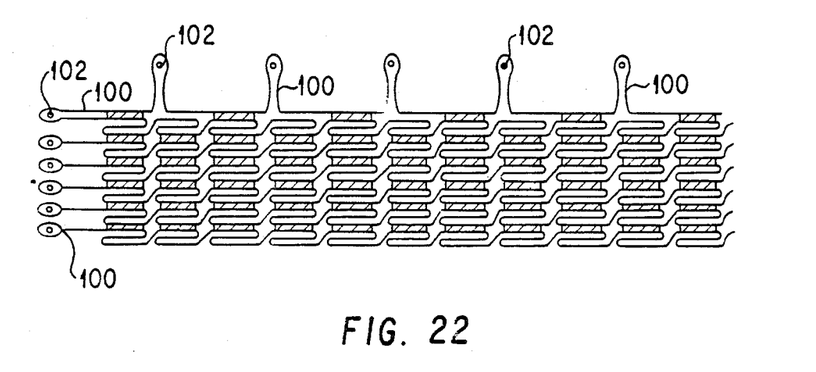
FIG. 22 is a side view of a laminate of the type shown in FIG. 17 attached to an extending means.
Figure 23:
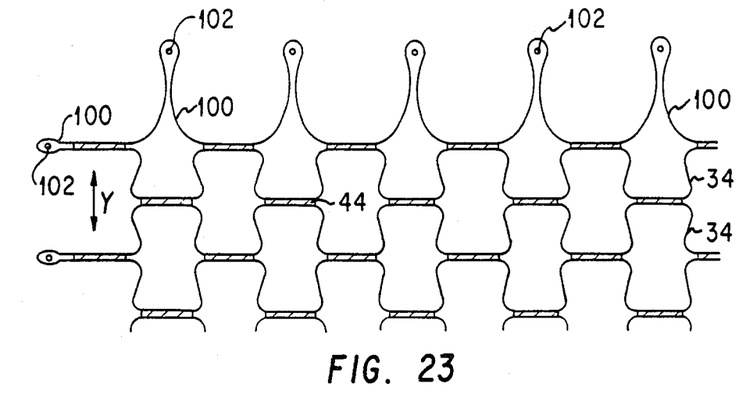
FIG. 23 is a side view of the laminate shown in FIG. 20 after the laminate has been extended in a first direction.
Figure 24:
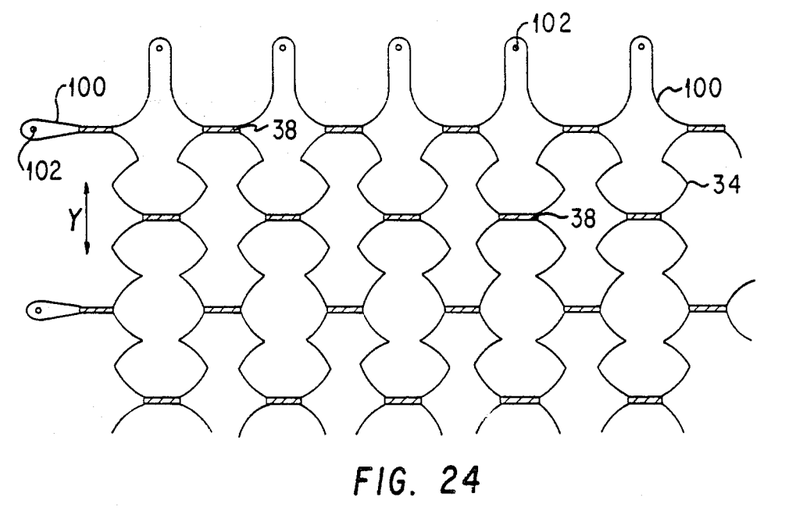
FIG. 24 is a side view of the laminate shown in FIG. 21 after the laminate has been extended in a first direction.
Figure 25:
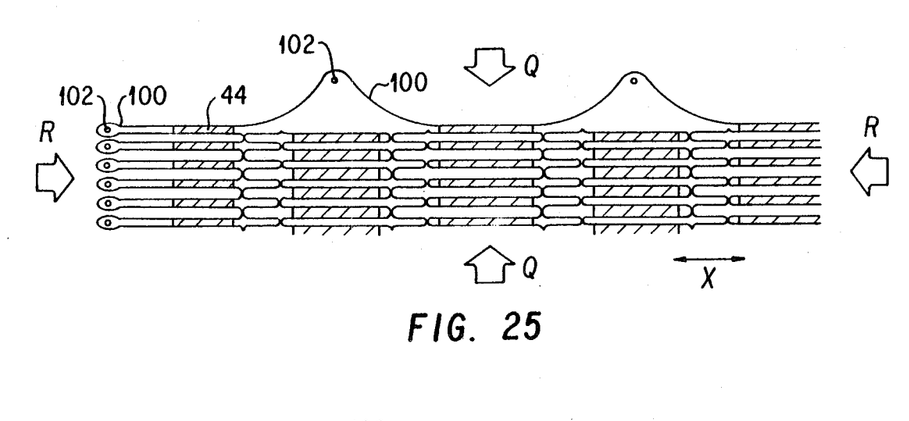
FIG. 25 is a side view of the laminate shown in FIG. 23 after the laminate has been extended in a second direction.
Figure 26:
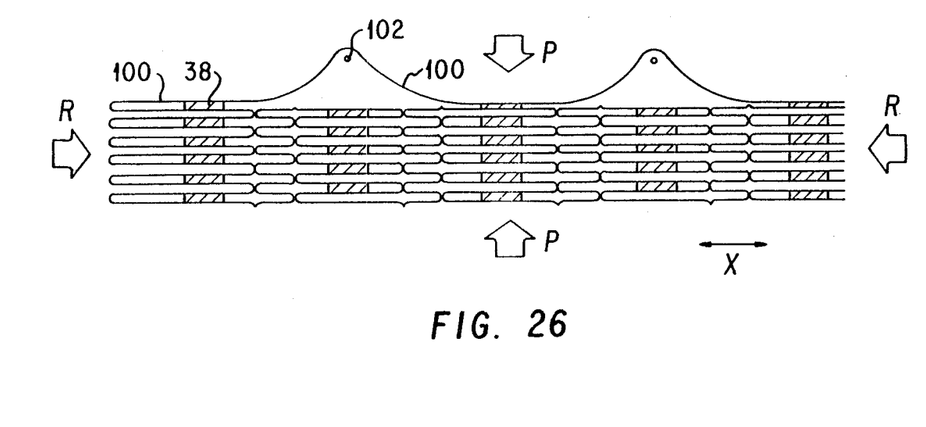
FIG. 26 is a side view of the laminate shown in FIG. 24 after the laminate has been extended in a second direction.

The sliced laminate is thereafter placed on an extending apparatus as shown in FIGS. 20-22, and hooking loops 100 which may be provided on the periphery of the laminate are hooked up on the movable and fixed pins 102 of the extending apparatus (not shown). Preferably, by moving at least some of the pins with respect to other, opposing pins, the sliced laminate is somewhat extended first in the direction of lamination, indicated by arrow Y for example in FIGS. 23 and 24, so that the bent part of multi-layered folded sheet somewhat opens. As shown in FIGS. 25 and 26, the laminate is then largely extended in the longitudinal direction X or the direction perpendicular to the direction of lamination until the multi-layered folded sheet becomes nearly planar. Preferably, a surface pressure of 0.1-10 kg/cm$^2$ is applied at this time in the direction of lamination indicated by the arrows Q in FIGS. 25 and 26. Then, the tensile force for the extension is relaxed and left in that condition or is additionally deformed by applying an appropriate pressure to the extended sliced laminate in the direction reverse to the direction of extension as indicated by the arrows R. When this procedure is carried out on the laminate shown in FIG. 26, wherein a laminate of the type shown in FIG. 15 is undergoing extension, the sliced laminate bends at the positions of "crease" where previous bends occured, due to the restoring force of the multi-layered folded sheet and, at the same time, it newly bends at the position of borderline between the area coated with adhesive and the areas 96 not coated with adhesive. This results in a honeycomb-like perforated core having fourteen corners or an analogous shape. The dimensions of each core are dependent on the distance between a crease and the adjacent crease (crease-crease distance). By varying the design of this distance, various cores having a cell diameter of 2-30 mm, preferably 3-8 mm, can be produced.

The same procedure may be employed with any of the multi-layered folded sheet laminates discussed above in order to expand the sliced laminate into various honeycomb-like perforated cores having different cell shapes.

Certain variations may be employed in the procedure in order to achieve certain desired characteristics in the cores without departing from the invention. For example, the amount and direction of deformation in the direction of lamination as well as in the direction perpendicular to lamination may be changed from the amount and direction discussed above. It may be desirable not to cause any deformation in the direction of lamination, but rather to extend the laminate only in the direction perpendicular to lamination. Alternatively, a satisfactory core may be produced by applying both tensile and compressive forces in either or both of the extending directions.

Finally, a skin material (not shown) is applied to both sides or to one side of the core thus obtained, whereby a sandwich type laminated panel can be obtained. Conventional materials used as the skin material include thin-gage plate metal such as aluminum, steel and stainless steel, resin-impregnated woven fabric and other fiber-reinforced plastics. Thin-gage skins made of stone material such as slate, marble and the like are also usable. When a prepreg or the like is used as the skin material, appropriate heating and pressing must be applied thereto. When skin material is bonded to a core through intermediation of an adhesive tape, a practice of providing a heating and pressing treatment is similarly advatageous from an economic viewpoint.

The laminated panel of the preferred embodiment is relatively light in weight. Its strength is higher than that of prior aluminum honeycomb panels, and its superiority in strength exceeds the expected value calculated from the stainless steel/aluminum strength ratio (the ratio between the materials themselves. Further, the panel of the preferred embodiments is not corroded by water, particularly saline water, and it is not deformed even if exposed to a considerable heat. Thus, it is free from the risk of rusting and thermal deformetion, is quite excellent in corrosion resistance and heat resistance, and may find utility in a diversity of panel products.

As compared with aluminum foil and the like, stainless steel foil of the type employed in the present invention has a very high stiffness. If one once folds stainless steel and thereafter tries to open it into its original form, a great restoring force acts so as to again fold the opened foil at the position of creases therein. Accordingly, if a stainless steel foil is continuously folded to form a number of three-layered folded sheets, the sheets are laminated, the laminate is sliced, and the sliced laminate is extended and deformed so that the folded laminate is opened so as to become nearly planar and thereafter is released according to the process of the invention so that the sliced laminate is deformed and again folded at the position of crease, it is possible to obtain a honeycomb-like perforated stainless steel core having various core forms. That is to say, the process of the invention is a process for forming a stainless steel core which makes the most of the stiffness of stainless steel foil and its restoring force. In the process of the invention, the stainless steel foil itself is hardly injured, even if the sliced laminate is extended to the maximum extent and is then forcibly return-deformed by applying a pressure thereto in the direction reverse to the direction of extension.

Making contrast to stainless steel, aluminum foil, which is largely in use as a pnel core material, is inferior in stiffness to stainless steel foil. Accordingly, if it is once folded and then opened, a great strain often remains at the position of the creases, which may cause a crack formation at the crease and a breakage at the position of folding. Accordingly, if aluminum foil is used for the preparation of laminated panel core according to the same procedure as in the process of the invention, cracking of the foil and deformation of the three-layered folded sheet may readily take place. Thus, such a method of preparation is quite difficult to practice, and even if it is possible, the panel core thus obtained is very poor in strength.

What is claimed is:

1. A stainless steel foil core for use in a laminated panel which consists of
   a plurality of strips of stainless steel foil, each of said strips being bent in a repeating outward and inward pattern along a plurality of parallel lines extending perpendicular to the length of said strips, the bending step forming rectangular-like depressions in the strips defined by the plurality of lines which are parallel to one another;
   adhesive material interposed between said strips at spaced intervals along the length of said strips so as to bond said plural strips together at said spaced intervals, said bonded strips defining a plurality of cells each having an equal number of sides.

2. The stainless steel foil core according to claim 1, wherein each of said cells has fourteen sides.

3. The stainless steel foil core according to claim 1, wherein each of said cells has a rectangular shape.

4. The stainless steel foil core according to claim 1, wherein each of said cells has a hexagonal shape.

5. A three-level folded sheet for use in a laminated panel core which consists of a stainless steel foil sheet which is bent along a plurality of parallel lines in a repeatedly alternating outward, inward, inward, outward folding so that creases are formed which are parallel to one another.

6. A process for producing a honeycomb core made of stainless steel which comprises subjecting stainless steel foils to repeated outward and inward foldings along a plurality of parallel lines extending perpendicular to the length of said foils to form rectangular-like depressions in the foils which depressions are defined by creases which are parallel to one another resulting in a plurality of multi-level folded sheets of stainless steel;

applying an adhesive to a portion of the surfaces of the folded sheets;

laminating a desired number of the folded sheets, said adhesive causing said sheets to adhere to one another in the areas of application of the adhesive;

slicing the laminate in a plane perpendicular to the plane generally defined by each of said folded sheets; and extending and deforming the sliced laminate in a plane parallel to the plane in which said laminate is sliced and in the direction of the lamination of the sheets.

7. The process according to claim 6, wherein the sliced laminate of the folded sheet is further extended and deformed in a plane parallel to the plane in which said laminate is sliced and in a direction perpendicular to the direction of lamination of the sheets.

8. The process according to claim 6, wherein the sliced laminate of the folded sheet is further extended and deformed in a plane parallel to the plane in which said laminate is sliced and in a direction perpendicular to the direction of lamination until the multi-layered sheet becomes nearly planar and, thereafter, a surface pressure is applied to the laminate in the direction of lamination.

9. The process according to claim 6, wherein the sliced laminate of the folded sheets is further extended and deformed in a plane parallel to the plane in which said laminate is sliced and in a direction perpendicular to the direction of lamination until folded sheets become nearly planar and then the extended laminate is subjected to a return deformation by applying a pressure having a direction reverse to the direction of the further extension.

10. The process according to claim 6, further including the step of mechanically or chemically treating the surfaces of the folded sheets to enhance the adhesive effect of the adhesive applied thereto.

11. The process according to claim 6, further including the step of pressing the folded sheets together to permit adhesion of the adhesive to the sheets.

12. The process according to claim 6, further including the steps of applying skin layers to the sides of the laminate which are in a plane parallel to the plane in which the laminate is sliced.

* * * * *